United States Patent
Ward et al.

(10) Patent No.: US 11,691,429 B2
(45) Date of Patent: *Jul. 4, 2023

(54) SUPPLY AUTHENTICATION VIA TIMING CHALLENGE RESPONSE

(71) Applicant: Hewlett-Packard Development Company, L.P., Spring, TX (US)

(72) Inventors: Jefferson P. Ward, Brush Prairie, WA (US); Stephen D. Panshin, Corvallis, OR (US)

(73) Assignee: Hewlett-Packard Development Company L.P., Spring, TX (US)

(*) Notice: Subject to any disclaimer, the term of this patent is extended or adjusted under 35 U.S.C. 154(b) by 163 days.

This patent is subject to a terminal disclaimer.

(21) Appl. No.: 17/405,638

(22) Filed: Aug. 18, 2021

(65) Prior Publication Data

US 2021/0379902 A1    Dec. 9, 2021

Related U.S. Application Data

(60) Continuation of application No. 16/218,229, filed on Dec. 12, 2018, now Pat. No. 11,123,994, which is a
(Continued)

(51) Int. Cl.
*H04L 9/32* (2006.01)
*B41J 2/175* (2006.01)
(Continued)

(52) U.S. Cl.
CPC ....... *B41J 2/17543* (2013.01); *B41J 2/17546* (2013.01); *G06F 7/58* (2013.01);
(Continued)

(58) Field of Classification Search
CPC ..... B41J 2/17543; B41J 2/17546; G06F 7/58; G06F 21/445; G06Q 30/018; H04L 9/00;
(Continued)

(56) References Cited

U.S. PATENT DOCUMENTS

| 5,892,900 A | 4/1999 | Ginter et al. |
| 7,623,255 B2 | 11/2009 | Simpson |

(Continued)

FOREIGN PATENT DOCUMENTS

| CN | 1376583 A | 10/2002 |
| CN | 1520670 A | 8/2004 |

(Continued)

OTHER PUBLICATIONS

Ron White, How Computers Work, Oct. 15, 2003, Que Publishing, 7th Ed, p. 4.
(Continued)

*Primary Examiner* — Steven S Kim
*Assistant Examiner* — Nakia Leffall-Allen
(74) *Attorney, Agent, or Firm* — Foley & Lardner LLP

(57) ABSTRACT

In an example implementation, a print supply cartridge comprises a microcontroller to receive a timing challenge and enable authentication of the cartridge by providing a challenge response. The challenge response is provided in a challenge response time that falls within an expected time window.

20 Claims, 4 Drawing Sheets

Related U.S. Application Data division of application No. 15/499,537, filed on Apr. 27, 2017, now Pat. No. 11,020,976, which is a continuation of application No. 15/368,369, filed on Dec. 2, 2016, now Pat. No. 11,027,554, which is a continuation of application No. 14/910,816, filed as application No. PCT/US2013/057674 on Aug. 30, 2013, now Pat. No. 9,561,662.

(51) Int. Cl.
| | |
|---|---|
| *G06F 21/44* | (2013.01) |
| *H04L 9/40* | (2022.01) |
| *G06F 7/58* | (2006.01) |
| *H04W 12/61* | (2021.01) |
| *G06Q 30/018* | (2023.01) |

(52) U.S. Cl.
CPC .......... *G06F 21/445* (2013.01); *H04L 9/3242* (2013.01); *H04L 9/3247* (2013.01); *H04L 9/3271* (2013.01); *H04L 63/0876* (2013.01); *G06Q 30/018* (2013.01); *H04L 2463/121* (2013.01); *H04W 12/61* (2021.01)

(58) Field of Classification Search
CPC ....... H04L 9/32; H04L 9/3242; H04L 9/3271; H04L 63/0876; H04L 2463/121
See application file for complete search history.

(56) References Cited

U.S. PATENT DOCUMENTS

| | | | |
|---|---|---|---|
| 7,685,424 B2 | 3/2010 | Walmsley et al. | |
| 7,877,815 B2 | 1/2011 | Yoo et al. | |
| 8,278,870 B2 | 10/2012 | Little | |
| 8,370,260 B2 | 2/2013 | Walmsley et al. | |
| 8,953,222 B2 | 2/2015 | Kobayashi et al. | |
| 9,619,663 B2 | 4/2017 | Refstrup | |
| 2003/0005324 A1 | 1/2003 | Epstein | |
| 2004/0049678 A1* | 3/2004 | Walsmley | G06Q 20/40975 |
| | | | 713/168 |
| 2004/0162983 A1 | 8/2004 | Gotoh et al. | |
| 2004/0223011 A1 | 11/2004 | Adkins et al. | |
| 2005/0036801 A1 | 2/2005 | Burchette | |
| 2005/0206694 A1* | 9/2005 | Wadley | B41J 2/17543 |
| | | | 347/85 |
| 2005/0268099 A1* | 12/2005 | Cusey | H04L 9/3236 |
| | | | 713/168 |
| 2006/0087678 A1* | 4/2006 | Simpson | G06F 21/34 |
| | | | 358/1.15 |
| 2006/0210082 A1* | 9/2006 | Devadas | G11C 7/24 |
| | | | 380/277 |
| 2007/0011023 A1* | 1/2007 | Silverbrook | B41J 2/17513 |
| | | | 705/317 |
| 2007/0035566 A1* | 2/2007 | Silverbrook | H04N 5/2628 |
| | | | 347/2 |
| 2008/0022874 A1* | 1/2008 | Silverbrook | B41J 2/14 |
| | | | 101/330 |
| 2008/0077802 A1 | 3/2008 | Richardson et al. | |
| 2009/0240516 A1* | 9/2009 | Palestrant | G06Q 50/01 |
| | | | 705/346 |
| 2009/0313472 A1* | 12/2009 | Guccione | H04L 63/061 |
| | | | 380/46 |
| 2010/0224682 A1 | 9/2010 | Busch-Sorensen | |
| 2010/0250480 A1* | 9/2010 | Cherkasova | G06N 5/02 |
| | | | 706/46 |
| 2011/0075189 A1* | 3/2011 | Refstrup | G06F 21/608 |
| | | | 358/1.14 |
| 2011/0078457 A1 | 3/2011 | Starr et al. | |
| 2012/0078548 A1 | 3/2012 | Salazar et al. | |
| 2012/0221863 A1* | 8/2012 | Osaka | G06F 21/34 |
| | | | 713/189 |
| 2013/0070279 A1 | 3/2013 | Misumi | |
| 2016/0214391 A1 | 7/2016 | Ward et al. | |
| 2019/0111693 A1 | 4/2019 | Ward et al. | |

FOREIGN PATENT DOCUMENTS

| | | |
|---|---|---|
| CN | 101044754 A | 9/2007 |
| CN | 101167295 A | 4/2008 |
| CN | 100550878 C | 10/2009 |
| CN | 100551015 C | 10/2009 |
| CN | 102651689 A | 8/2012 |
| CN | 102658724 A | 9/2012 |
| CN | 103262464 A | 8/2013 |
| EP | 1441485 A2 | 7/2004 |
| JP | 2008140039 A2 | 6/2008 |
| JP | 2008292840 A | 12/2008 |
| JP | 2011066936 A | 3/2011 |
| JP | 2012013928 A | 1/2012 |
| JP | 2012174195 A | 9/2012 |
| JP | 2013062780 A | 4/2013 |
| KR | 20090006954 A | 1/2009 |
| KR | 20110031435 A | 3/2011 |
| TW | 1321528 B | 3/2010 |
| WO | 2006052111 A1 | 5/2006 |
| WO | 2007072814 A1 | 6/2007 |
| WO | 2008037000 A1 | 4/2008 |
| WO | 2011120974 A1 | 10/2011 |
| WO | 2013048430 A1 | 4/2013 |
| WO | 2013062528 A1 | 5/2013 |

OTHER PUBLICATIONS

Atmel Corporation, "High Quality Battery Authentication with AT88SA100S", 8670A-SMEM-5/09, May 2009, 10 pages.

Kumar, A. et al.; PHAP: Password Based Hardware Authentication Using PUFs; 2012 IEEE/ACM 45th International Symposium on Microarchitecture Workshops; Dec. 1-5, 2012; pp. 24-31.

Collins English Dictionary, "Logic circuit definition and meaning", retrieved from https://www.collinsdictionary.com/us/dictionary/english/logic-circuit, Aug. 2021, 3 pages.

Dictionary.com, "Logic circuit definition and meaning", retrieved from https://www.dictionary.com/browse/logic-circuit, on Aug. 2021, 6 pages.

Teach Computer Science, "Logic Circuit", retrieved from https://teachcomputerscience.com/logic-circuits/ on Aug. 2021, 5 pages.

Webopedia, "What does dedicated mean in computing?" Definition, https://www.webopedia.com/TERM/D/dedicated.html, Aug. 2021, 4 pages.

Korean Intellectual Property Office, "Search Report," issued in connection with Application No. 225/2016, last retrieved on Apr. 29, 2020 4 pages.

Korean Intellectual Property Office, "Examination Report," issued in connection with Application No. 225/2016, last retrieved on Apr. 29, 2020 4 pages.

Arvind Seshadri et al: "Using Fire & Ice for detecting and recovering compromised nodes in sensor networks", Carnegie Mellon University, Dec. 2004, 25 pages.

Li Yanlin et al: "VIPER: Verifying the Integrity of PERipherals' Firmware", Computer and communications security, Oct. 17, 2011 (Oct. 17, 2011), XP055453754, 14 pages (online at ACMDL only 5 pages).

Yanlin Li et al: "SBAP: Software-Based Attestation for Peripherals", Trust and Trustworthy Computing, Springer Berlin Heidelberg, Berlin, Heidelberg, vol. 6101, Jun. 21, 2010.

Xiangsheng Wang: "Studies on The Design and Implementation of Stream Ciphers"; Chinese Doctoral Dissertations & Master's Theses Full-text Database, 137 pages.

Logic circuit, retrieved on Nov. 24, 2020, 3 page.

Wikipedia, "Electronic hardware", 1 page.

United States Patent and Trademark Office, "Non-final office action," issued in connection with U.S. Appl. No. 16/218,229, dated Oct. 14, 2020, 11 pages.

United States Patent and Trademark Office, "Notice of Allowance," issued in connection with U.S. Appl. No. 16/218,229, dated May 24, 2021, 11 pages.

\* cited by examiner

SUPPLY AUTHENTICATION VIA TIMING CHALLENGE RESPONSE

RELATED APPLICATIONS

This patent arises from a continuation of U.S. patent application Ser. No. 16/218,229, which was filed on Dec. 12, 2018, which is a divisional application of U.S. patent application Ser. No. 15/499,537, which was filed on Apr. 27, 2017, which is a continuation of U.S. patent application Ser. No. 15/368,369, which was filed on Dec. 2, 2016, which a continuation of U.S. patent application Ser. No. 14/910,816, which was filed on Feb. 8, 2016, which is the U.S. national stage of International Patent Application Serial No. PCT/US2013/057674, having an international filing date of Aug. 30, 2013. Priority is claimed to U.S. patent application Ser. No. 16/218,229; U.S. patent application Ser. No. 15/499,537; U.S. patent application Ser. No. 15/368,369; U.S. patent application Ser. No. 14/910,816; and International Patent Application Serial No. PCT/US2013/057674. All of U.S. patent application Ser. No. 16/218,229; U.S. patent application Ser. No. 15/499,537; U.S. patent application Ser. No. 15/368,369; U.S. patent application Ser. No. 14/910,816; and International Patent Application Serial No. PCT/US2013/057674 are hereby incorporated by reference in their entireties.

BACKGROUND

Many systems have replaceable components that are integral to the functioning of the system. The replaceable components are often devices that contain consumable material that is depleted with each use of the system. Such systems may include, for example, cell phones that use replaceable batteries, medical systems that dispense medicine from replaceable supply devices, printing systems that dispense fluids (e.g., ink) or toners from replaceable supply cartridges, and so on. Verifying that a replaceable supply device is an authentic device from a legitimate manufacturer can help a system user avoid problems associated with the unintended use of a defective and/or counterfeit device.

BRIEF DESCRIPTION OF THE DRAWINGS

The present embodiments will now be described, by way of example, with reference to the accompanying drawings, in which.

Throughout the drawings, identical reference numbers designate similar, but not necessarily identical, elements.

DETAILED DESCRIPTION

Overview

Figures 1, 2:
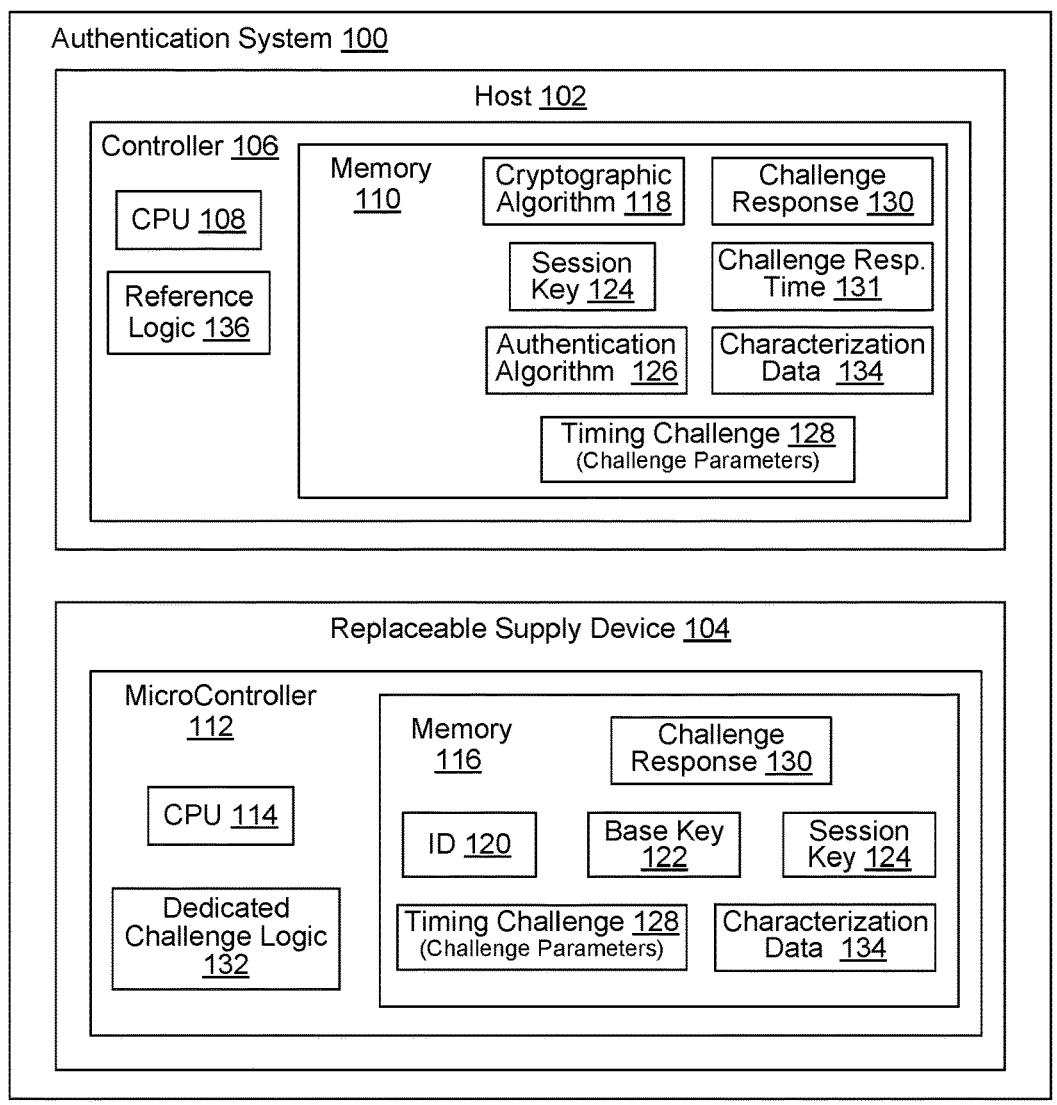
FIG. 1 shows a box diagram illustrating components of an example, generic authentication system suitable for authenticating a replaceable supply device.
FIG. 2 shows an example of characterization data stored on a replaceable supply device.

As noted above, verifying the authenticity of replaceable supply devices for use in certain systems can help system users avoid problems associated with the unintended use of defective and/or counterfeit devices. For example, in printing systems that employ consumable toner or ink cartridges, inadvertently replacing the cartridges with counterfeit cartridges can result in various problems ranging from poor quality printouts to leaky cartridges that can damage the printing system.

Prior methods of authenticating a replaceable device have included employing strong authentication that involves the use of a secret key known to a smart card or secure microcontroller on the replaceable device (e.g., consumable ink/toner cartridge) and the host device (e.g., printer). If the replaceable device can provide a response to a challenge issued by the host that proves it contains an appropriate key, the host will deduce that the device is of original manufacture, and then authenticate the device. One weakness with this method of authentication is that it relies on the ability of the system to preserve the secret key. If an attacker can recover a key or keys from either the host or the replaceable device, it can store the stolen key(s) in a smart card or microcontroller, enabling it to then create replaceable devices that will respond to challenges as if those devices were authentic devices from the original manufacturer. Typically, once the key(s) is compromised, the challenge response and other functionality of a non-authentic (i.e., counterfeit) replaceable device can be simulated with firmware running on an inexpensive, standard microcontroller.

Authentication systems and supply authentication processes are disclosed herein that provide for robust authentication of replaceable system devices, in general, through a timing challenge response. A host, such as a printer, issues a cryptographic timing challenge to a secure microcontroller affixed to a replaceable device, such as a consumable ink or toner cartridge. The challenge requests that the consumable device (i.e., the microcontroller on the consumable device) perform a number of mathematical operations based on data supplied by the host/printer. The printer monitors the amount of time it takes for the consumable device to complete the task, and independently verifies the response provided by the device. If the response and the time elapsed while computing the response both meet the expectations of the printer, the printer will conclude that the device is an authentic device. If either the response, or the time elapsed while computing the response (or both), does not meet the expectations of the printer, the printer will conclude that the device is not an authentic device.

The mathematical operations from the challenge are performed within the microcontroller of the consumable device by dedicated hardware logic specifically designed for such operations. The dedicated logic is capable of achieving the challenge response by performing the mathematical calculations significantly faster than could otherwise be achieved by a standard microcontroller executing firmware. Thus, a non-authentic/counterfeit replaceable device in which a microcontroller contains stolen key(s), may be capable of achieving a correct challenge response. However, such a counterfeit device is not capable of achieving the challenge response within a time frame expected by the host device.

In an example implementation, a print supply cartridge includes a microcontroller to receive a timing challenge and enable authentication of the cartridge by providing a challenge response in a challenge response time that falls within an expected time window. In another implementation, the cartridge further includes dedicated hardware logic on the microcontroller to perform a mathematical calculation in response to the timing challenge. Performing the mathematical calculation yields the challenge response within the expected time window.

In another example implementation, a replaceable supply device includes a microcontroller. The microcontroller is to derive a session key with a host device, and to receive a time-dependent challenge from the host device that specifies a random seed, the session key, and a calculation cycle. The replaceable device further includes dedicated logic within the microcontroller to perform a challenge calculation a number of times equal to the calculation cycle, wherein a first calculation uses the random seed and session key to produce an output, and each subsequent calculation uses an output of a preceding calculation.

In another example implementation, an authentication system includes a host device, a controller integrated into the host device, and an authentication algorithm executable on the controller to issue a cryptographic timing challenge and to authenticate the supply device when the supply device provides a challenge response in a challenge response time that falls within an expected time window.

In another example implementation, an authentication system includes a printer that has a controller and a memory. The authentication system also includes an authentication algorithm stored in the memory and executable on the controller to issue a cryptographic timing challenge and to authenticate a print supply cartridge when the cartridge provides a challenge response corresponding to an expected response within an expected time window.

In another example implementation, a non-transitory processor-readable medium stores code representing instructions that when executed by a processor cause the processor to recognize a supply device, and issue a cryptographic timing challenge to the supply device. The timing challenge requests a mathematical calculation to be performed on data that includes a session key, a random seed, and a calculation count. The instructions further cause the processor to receive a challenge response in a challenge response time from the supply device, and to authenticate the supply device when the challenge response matches an expected response and the challenge response time falls within an expected time window.

Example Implementations

FIG. 1 shows a box diagram illustrating components of an example, generic authentication system 100 suitable for authenticating a replaceable supply device. The authentication system 100 includes a host device 102 and a replaceable supply device 104. The host device 102 comprises a controller 106 that typically includes components of a standard computing system such as a processor (CPU) 108, a memory 110, firmware, and other electronics for controlling the general functions of the authentication system 100 and for communicating with and controlling supply device 104. Memory 110 can include both volatile (i.e., RAM) and nonvolatile (e.g., ROM, hard disk, floppy disk, CD-ROM, etc.) memory components comprising non-transitory computer/processor-readable media that provide for the storage of computer/processor-readable coded instructions and/or data in the form of algorithms, program modules, data structures, JDF, and so on. Supply device 104 comprises a microcontroller 112 (i.e., a smart card) that also includes a processor (CPU) 114 and a memory 116.

In general, upon power up of the host device 102, the host device 102 and supply device 104 establish secure communications through standard cryptographic techniques using standard cryptographic algorithms 118. For example, executing a cryptographic algorithm 118 (i.e., on processor 108), host device 102 can request the unique ID 120 of the supply device 104 and determine the device's "base key" 122 through a cryptographic relation. Using the base key 122, the host device and supply device can derive a secret "session key" 124 enabling secure communication for a current communication exchange. The host device 102 determines the base key 122 in this manner each time it is powered up, and each time a new supply device 104 is installed. The base key 122 remains the same and does not change. However, a new and different session key 124 is derived each time a communication exchange is made between the host device 102 and supply device 104.

In one implementation, memory 110 includes an authentication algorithm 126 executable on processor 108 of controller 106 to determine the authenticity of the replaceable supply device 104. The supply device 104 is determined to be authentic when it responds correctly to a cryptographic timing challenge 128 issued by the authentication algorithm 126, and when its response 130 to the challenge is completed within an expected window of time. Thus, a supply device 104 whose challenge response 130 value is correct, but whose challenge response time 131 does not fall within an expected window of time, is determined to not be authentic. Likewise, a supply device 104 whose challenge response time 131 falls within an expected window of time but whose challenge response 130 value is incorrect, is determined to not be authentic. The authenticity of the supply device 104, therefore, depends on it providing a correct response 130 to a cryptographic timing challenge 128 in a challenge response time 131 (i.e., the time it takes to provide the response 130) that falls within an expected window of time.

The cryptographic timing challenge 128 issued by the authentication algorithm 126 on host device 102 comprises a request to perform a specific mathematical calculation incorporating certain challenge parameters. The mathematical calculation is to be performed a particular number of times. The cryptographic timing challenge 128 includes or is accompanied by these challenge parameters, which include the derived session key, a random seed number generated on the host device 102 by controller 106, and a calculation count or cycle that indicates the number of times the calculation is to be performed. The mathematical calculation uses the session key and begins with an operation on the random seed number. The result or output of each calculation is repeatedly fed back into the next calculation until the calculation count has been reached. The last result or output of the mathematical calculation provides the challenge response 130, which will have been achieved or calculated in a particular challenge response time 131. The challenge response time 131 is measured by the authentication algorithm 126, for example, by starting a timing sequence when the challenge is issued, and stopping the timing sequence once the supply device 104 completes and returns the challenge response 130 to the host device 102. The challenge response time 131 is a temporary value that in some implementations may reside briefly on the host device 102 in a volatile component of memory 110 and/or within processor 108 prior to or during a comparison to a time window determined by the host. The authentication algorithm 126 on host 102 determines whether or not the challenge response 130 and the challenge response time 131 are correct (i.e., expected), and then authenticates the supply device 104 accordingly.

Referring still to FIG. 1, microcontroller 112 on supply device 104 comprises dedicated hardware challenge logic 132 for performing the mathematical calculation from a cryptographic timing challenge 128. The dedicated challenge logic 132 is specifically designed and fabricated on microcontroller 112 to optimally perform the particular mathematical calculation. In one example implementation, the mathematical calculation comprises a basic function that defines a sequence of operations optimized to run very fast in the dedicated logic 132. The mathematical calculation, or function, is iterated many times with the output of each iteration being part of the input to the next iteration. Thus, while one or more operands change with each iteration of the mathematical calculation, the mathematical calculation itself does not change. In addition, the challenge parameter values accompanying the timing challenge 128 may change with each timing challenge 128. Each timing challenge 128 issued by the authentication algorithm 126 to the supply device 104 may have different values for the session key, the random seed number generated on the host device 102 by controller 106, and the calculation count or cycle. Accordingly, for each timing challenge 128, the challenge response 130 and challenge response time 131 are determined by the challenge parameter values. More specifically, the session key, random seed, and calculation count all affect the challenge response value 130, while the calculation count also affects the challenge response time 131 by varying the number of iterations of the mathematical calculation through the dedicated challenge logic 132.

As noted above, the authentication algorithm 126 determines whether the challenge response 130 and the challenge response time 131, are correct or expected. This is done by comparing the challenge response 130 and response time 131 with correct or expected values. In different implementations, the algorithm 126 determines correct or expected values in different ways. In one implementation, for example, the algorithm 126 retrieves and accesses characterization data 134 stored on the supply device 104. The characterization data 134 can be secured with a digital signature and verified using standard cryptographic operations. The characterization data 134 provides expected time windows into which a challenge response time 131 should fall depending on the calculation count provided with the timing challenge 128. Thus, in one example as shown in FIG. 2, the characterization data 134 can include a table of data that associates different calculation count values with different time windows. By way of example only, such an association might indicate that for a calculation count of 10,000 (i.e., where the mathematical calculation is to be performed 10,000 times), the challenge response time 131 is expected to fall within a time window of 50-55 milliseconds. In another example, the characterization data 134 might be provided through a mathematical relation such as the slope-intercept formula, $y=mx+b$. Thus, for a given calculation count value, x, an expected time, y, can be determined. A time window can then be determined by the authentication algorithm 126 on host 102, for example, by using the expected time y, +/−5%.

In another example implementation, the authentication algorithm 126 determines correct or expected values for the challenge response 130 by issuing the cryptographic timing challenge 128 to dedicated reference logic 136 on the host device controller 106. The reference logic 136 on controller 106 mirrors the dedicated hardware logic 132 on the supply device 104, and is therefore specifically designed and fabricated on controller 106 to optimally perform the mathematical calculation from the timing challenge 128. Thus, when the authentication algorithm 126 issues the timing challenge 128 to the supply device 104, it also issues the timing challenge 128 to the reference logic 136. The reference logic 136 performs the mathematical calculations from the challenge in the same manner as discussed above with regard to the dedicated hardware logic 132 on the supply device 104. In response to the timing challenge 128, the reference logic 136 completes the challenge and provides a reference response in a reference time. A reference response time window can be defined, for example, to be within a certain percent (e.g., +/−5%, +/−10%) of the reference time. The authentication algorithm 126 can then use the reference response and the reference response time window as expected values to compare with the challenge response 130 and the challenge response time 131. If the challenge response 130 matches the reference response and the challenge response time 131 falls within the reference response time window, the algorithm 126 determines that the supply device 104 is an authentic device.

Figure 3:
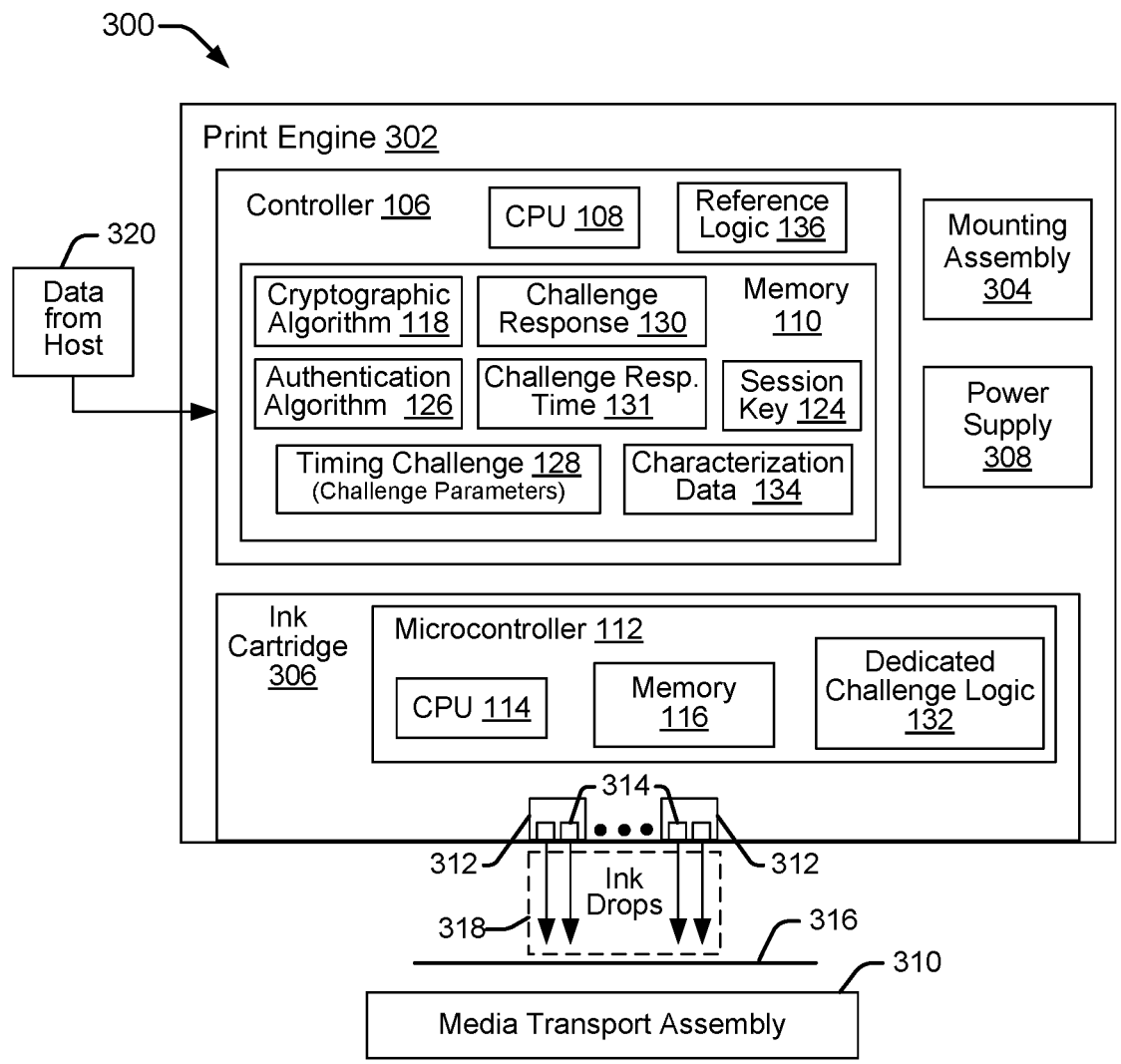
FIG. 3 shows an example of an authentication system embodied as an inkjet printing system.

FIG. 3 shows an example of an authentication system 100 embodied as an inkjet printing system 300. In general, the printing system 300 comprises the same or similar components as the general authentication system 100, and functions in the same or similar manner regarding the authentication of replaceable inkjet supply cartridges. In an example implementation, the inkjet printing system 300 includes a print engine 302 having a controller 106, a mounting assembly 304, one or more replaceable supply devices 104 embodied as ink supply cartridges 306, and at least one power supply 308 that provides power to the various electrical components of inkjet printing system 300. Printing system 300 additionally includes media transport assembly 310.

Figure 4:
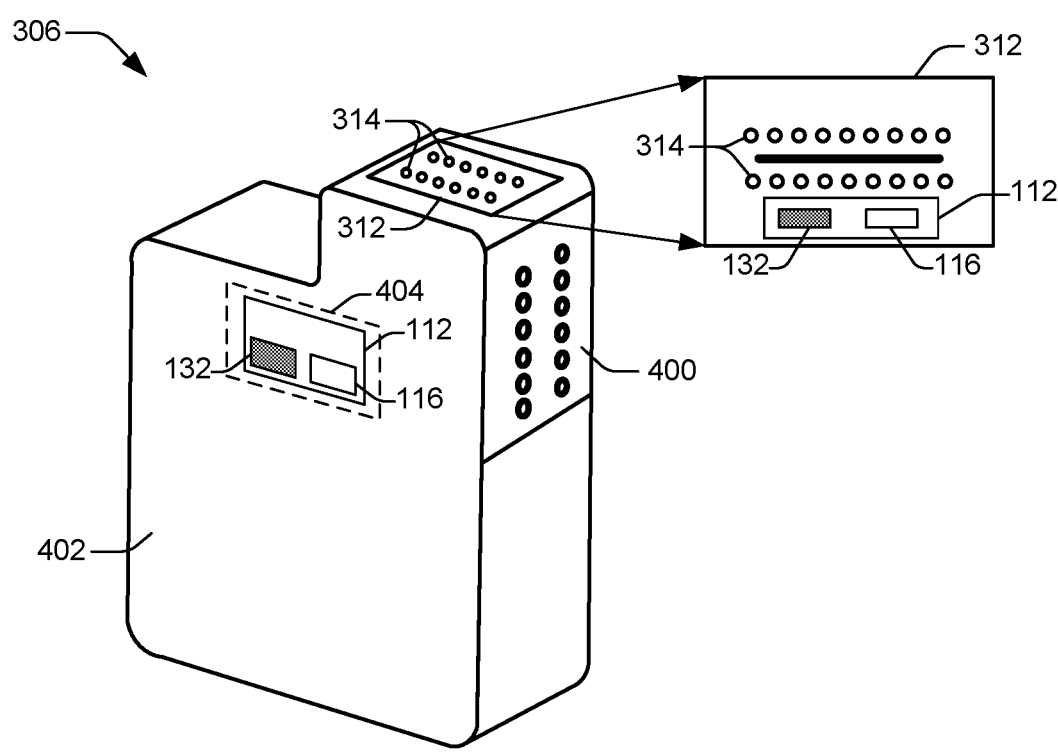
FIG. 4 shows a perspective view of an example inkjet print supply cartridge.

FIG. 4 shows a perspective view of an example inkjet supply cartridge 306 that represents a replaceable supply device 104. In addition to one or more printheads 312, inkjet cartridge 306 includes a microcontroller 112, a group of electrical contacts 400, and an ink (or other fluid) supply chamber 402. In some implementations, cartridge 306 may have a supply chamber 402 that stores one color of ink, and in other implementations it may have a number of chambers 402 that each stores a different color of ink. Electrical contacts 400 carry electrical signals from controller 106 to nozzles 314 on printhead 312 to cause the ejection of fluid drops. Electrical contacts 400 also carry electrical signals between controller 106 and microcontroller 112 to facilitate the authentication of the cartridge 306 within the inkjet printing system 300. In one example implementation, microcontroller 112 is located on a silicon substrate shared by printhead 312. In another example implementation, microcontroller 112 is located elsewhere on the cartridge 306 as a stand-alone smart card. Microcontroller 112 is analogous to, and includes the same general components (not all shown in FIG. 4) of, the microcontroller 112 shown in FIG. 1 and discussed above. Thus, microcontroller 112 on cartridge 306 comprises memory 116 and dedicated challenge logic 132, which function in the same general manner as discussed above with regard to the authentication system 100 of FIGS. 1 and 2.

Referring to FIGS. 3 and 4, printhead 312 ejects drops of ink or other fluid through a plurality of orifices or nozzles 314 toward a print medium 316 so as to print onto print medium 316. Print media 316 can be any type of suitable sheet or roll material, such as paper, card stock, transparencies, Mylar, polyester, plywood, foam board, fabric, canvas, and the like. Printhead 312 can be configured to eject ink through nozzles 314 in a variety of ways. For example, a thermal inkjet printhead ejects drops from a nozzle by passing electrical current through a heating element to generate heat and vaporize a small portion of the ink within a firing chamber. The vapor bubble forces a drop of ink through the nozzle 314. In another example, a piezoelectric inkjet printhead uses a piezoelectric material actuator to generate pressure pulses that force ink drops out of a nozzle. Nozzles 314 are typically arranged in one or more columns or arrays along printhead 312 such that properly sequenced ejection of ink from nozzles 314 causes characters, symbols, and/or other graphics or images to be printed on print media 316 as inkjet cartridge 306 and print media 316 are moved relative to each other.

Mounting assembly 304 positions inkjet cartridge 306 relative to media transport assembly 310, and media transport assembly 310 positions print media 316 relative to inkjet cartridge 306. Thus, a print zone 318 is defined adjacent to nozzles 314 in an area between inkjet cartridge 306 and print media 316. In one implementation, print engine 302 is a scanning type print engine 302. As such, mounting assembly 304 includes a carriage for moving inkjet cartridge 306 relative to media transport assembly 310 to scan print media 316. In another implementation, print engine 302 is a non-scanning type print engine 302. As such, mounting assembly 304 fixes inkjet cartridge 306 at a prescribed position relative to media transport assembly 310 while media transport assembly 310 positions print media 316 relative to inkjet cartridge 306.

As noted above with regard to the authentication system 100 of FIG. 1, a controller 106 typically includes components of a standard computing system such as a processor (CPU) 108, a memory 110, firmware, and other electronics. In the inkjet printing system 300 of FIG. 3, controller 106 likewise employs such components for controlling the general functions of the printing system 300 and for communicating with and controlling inkjet cartridge 306, mounting assembly 304, and media transport assembly 310. Accordingly, controller 106 receives data 320 from a host system, such as a computer, and temporarily stores the data 320 in a memory 110. Typically, data 320 is sent to inkjet printing system 300 along an electronic, infrared, optical, or other information transfer path. Data 320 represents, for example, a document and/or file to be printed. As such, data 320 forms a print job for inkjet printing system 300 that includes one or more print job commands and/or command parameters. Using data 320, controller 106 controls inkjet cartridge 306 to eject ink drops from nozzles 314. Thus, controller 106 defines a pattern of ejected ink drops that form characters, symbols, and/or other graphics or images on print medium 316. The pattern of ejected ink drops is determined by the print job commands and/or command parameters from data 320.

Figure 5:
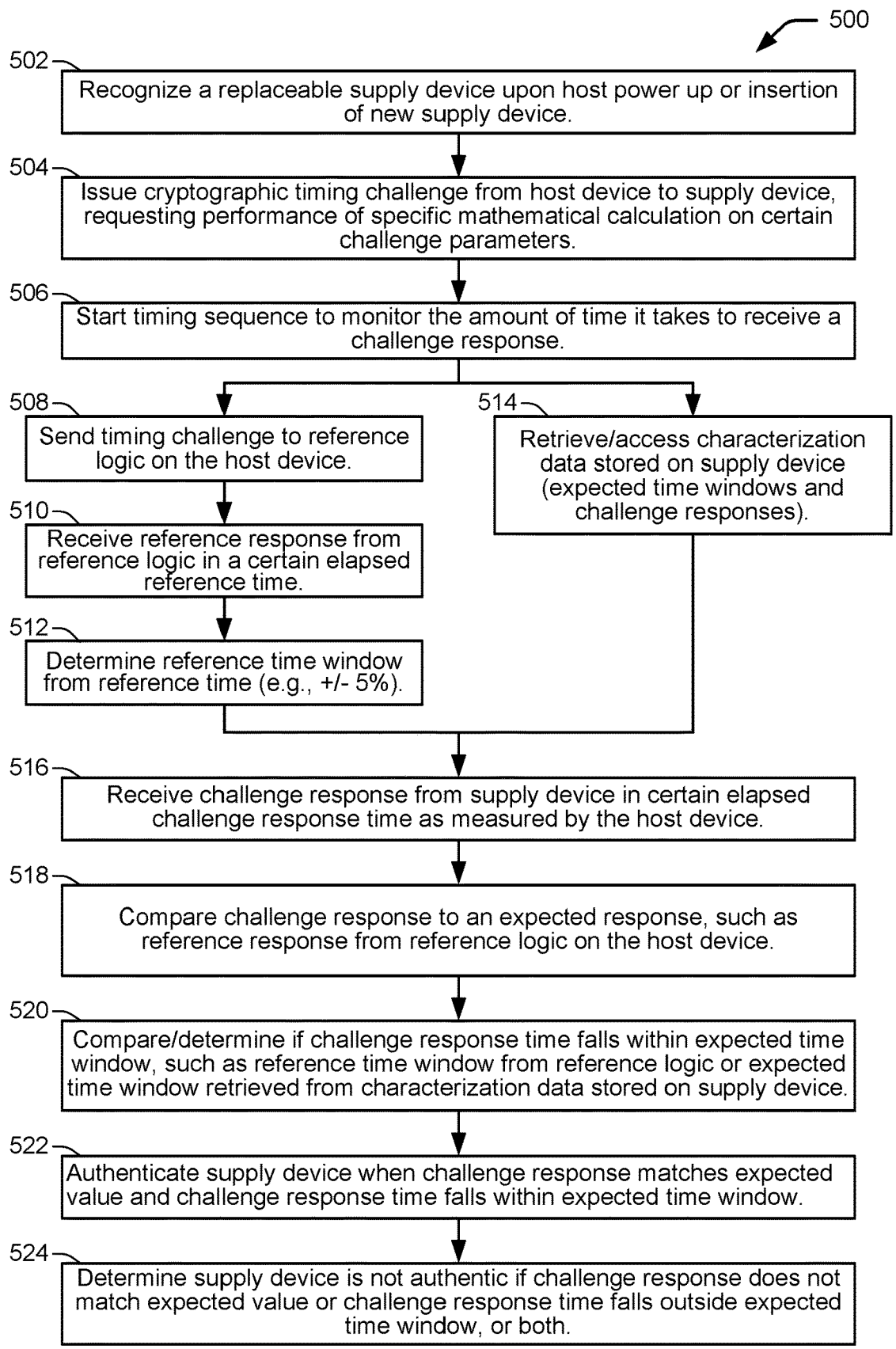
FIG. 5 shows a flow diagram of an example supply authentication process.

In addition to managing the general printing functions of inkjet printing system 300, controller 106 executes an authentication algorithm 126 to determine whether an inkjet supply cartridge 306 is an authentic device. This authentication process on printing system 300 is similar to the process described above regarding the general authentication system 100 of FIG. 1. FIG. 5 is a flow diagram of an example authentication process 500 on a printing system 300 or other authentication system 100 that determines whether a replaceable supply device 104 such as an inkjet supply cartridge 306 is an authentic device. The process 500 is associated with the example implementations discussed above with regard to FIGS. 1-4, and details of the steps shown in process 500 can be found in the related discussion of such implementations. The steps of process 500 may be embodied as an algorithm comprising programming instructions stored on a non-transitory computer/processor-readable medium, such as memory 110 of FIGS. 1 and 3. In different examples, the implementation of the steps of process 500 is achieved by the reading and execution of such programming instructions by a processor, such as processor 108 of FIGS. 1 and 3. The process 500 may include more than one implementation, and different implementations of process 500 may not employ every step presented in the flow diagram of FIG. 5. Therefore, while steps of process 500 are presented in a particular order within the flow diagram, the order of their presentation is not intended to be a limitation as to the order in which the steps may actually be implemented, or as to whether all of the steps may be implemented. For example, one implementation of process 500 might be achieved through the performance of a number of initial steps, without performing one or more subsequent steps, while another implementation of process 500 might be achieved through the performance of all of the steps.

Referring now primarily to FIGS. 1, 3, and 5, an authentication process 500 begins at block 502, where the first step shown is to recognize a replaceable supply device. Recognizing a replaceable supply device typically occurs on power up of a host device or the insertion of a new supply device into a host device, such as when a printing system is turned on or when an ink or toner print supply cartridge is replaced in a printing system. The replaceable supply device can also be recognized when the supply device is powered up at the beginning of each print job. The authentication process 500 continues at block 504, where a cryptographic timing challenge is issued. The timing challenge is issued from a host device such as a printing device and sent to a supply device such as a print supply cartridge. The timing challenge comprises a request to perform a specific mathematical calculation involving certain challenge parameters that include a session key derived between a host device and a supply device, a random seed number generated by the host device, and a calculation count or cycle that indicates the number of times the calculation is to be performed. Upon issuing the timing challenge, the host device may begin a timing sequence to monitor the amount of time it takes to receive a challenge response, as shown at block 506.

In some implementations the timing challenge may also be sent to reference logic on the host device, as shown at block 508. When the timing challenge is sent to reference logic on the host device, a reference response is received from the logic in a certain amount of elapsed reference time, as shown at block 510. At block 512, a reference time window may be determined by including a range around the reference time of a certain percent. For example, a reference time window may be determined to be the reference time, plus or minus 5% of the reference time. In some implementations, as an alternative to sending the timing challenge to reference logic on the host device, the host device retrieves and accesses characterization data stored on the supply device, as shown at block 514. In another implementation, the characterization data may be hard-coded into a memory of the host device. The characterization data includes expected time windows for receiving a challenge response from the supply device that are associated with different calculation count values.

As shown at block 516, the authentication process 500 includes receiving a challenge response from the supply device. The challenge response is received in a certain challenge response time that can be determined, for example, by a time measurement on the host device. The process 500 continues at block 518 with comparing the challenge response to an expected response. The expected response can be the reference response received from the reference logic on the host device. At block 520, the challenge response time is also compared to an expected response time window to determine if the challenge response time falls within the expected time window. The expected time window can be the reference time window or an expected time window retrieved from the characterization data stored on the supply device or elsewhere.

The authentication process 500 continues at block 522 with the host device authenticating the supply device when the challenge response from the supply device matches an expected value and the challenge response time falls within an expected time window. At block 524 of process 500, the host device determines that the supply device is not authentic when either the challenge response does not match an expected value, or the challenge response time falls outside an expected time window, or both.

What is claimed is:

1. A device to facilitate authentication of a replaceable supply device, the device separate from a host, the device comprising:
    electrical contacts that communicate data with the host during operation, the electrical contacts to obtain a timing challenge from the host;
    at least one memory having stored thereon a base key, a challenge response time, and a calculation count for the challenge response time;
    processor circuitry to execute first instructions to generate a plurality of session keys based on the base key, respective session keys specific to particular communication exchanges between the CPU and the host; and
    a dedicated hardware logic circuit to execute second instructions to:
        perform an initial calculation based on a mathematical function with a random seed and one of the plurality of sessions keys as inputs;
        perform a number of additional calculations with the output of a prior calculation as input, the number of additional calculations based on the calculation count; and
        determine a challenge response based on an output of a last of the additional calculations, within the challenge response time; and
    the processor circuitry to cause communication of the challenge response to the host via the electrical contacts.

2. The device of claim 1, wherein the challenge response time depends on the calculation count.

3. The device of claim 1, the at least one memory further having an identifier (ID), the hardware logic circuit to use the ID as input.

4. The device of claim 1, further including a microcontroller that includes the processor circuitry, the dedicated hardware logic circuit, and the memory.

5. The device of claim 1, wherein the dedicated logic circuit is to execute the second instructions to perform the additional calculations including determining the time window (y) based on the calculation count (x) according to a slope-intercept formula (y=mx+b).

6. The device of claim 1, wherein the calculation count is secured with a digital signature.

7. The device of claim 6, wherein the challenge response time is secured with the digital signature.

8. A print cartridge comprising:
    a print material supply chamber;
    at least one memory to store a plurality of calculation counts and a plurality of time windows corresponding to the plurality of calculation counts; and
    logic circuitry to execute instructions to:
        perform a first challenge calculation of a plurality of challenge calculations, the first challenge calculation to be performed with input parameters to produce an output, the input parameters including a session key that is different for each time challenge calculation session,
        repeatedly perform a number of subsequent challenge calculations, respective subsequent challenge calculations using an output of a preceding calculation, the number of subsequent calculations based on one of the plurality of calculation counts and affecting the response time, and
        use an output of a last challenge calculation for a timing response value, the plurality of challenge calculations to be performed within one of the plurality of time windows that corresponds to the one of the plurality of calculation counts; and
        provide the timing response value within the time window to authenticate the print cartridge.

9. The print cartridge of claim 8, wherein the plurality of calculation counts is secured with a digital signature.

10. The print cartridge of claim 9, wherein the plurality of time windows is secured with the digital signature.

11. The print cartridge of claim 8, wherein the at least one memory includes a base key, the session key based on the base key.

12. The print cartridge of claim 8, wherein the at least one memory includes a cartridge ID, the logic circuitry to use the cartridge ID as one of the input parameters.

13. The print cartridge of claim 8, wherein one or more operands of the challenge calculation change with respective iterations of the challenge calculation, a function of the challenge calculation remains unchanged between iterations.

14. A print cartridge comprising:
    a print material supply chamber;
    at least one memory to store at least one time window and at least one calculation count, respective ones of the at least one calculation count corresponding to respective ones of the at least one time window; and
    logic circuitry to execute instructions to:
        perform a first challenge calculation of a plurality of challenge calculations, the first challenge calculation to be performed with input parameters to produce an output, the input parameters including a session key that is different for each time challenge calculation session,
        repeatedly perform a number of subsequent challenge calculations, respective subsequent challenge calculations using an output of a preceding calculation, the number of subsequent calculations based on one of the at least one calculation count and affecting the response time, and
        use an output of a last challenge calculation for a timing response value, the plurality of challenge calculations to be performed within one of the at least one time window that corresponds to the one of the at least one calculation count; and
        provide the timing response value within the time window to authenticate the print cartridge.

15. The print cartridge of claim 14, wherein the at least one calculation count is secured with a digital signature.

16. The print cartridge of claim 15, wherein the at least one time window is secured with the digital signature.

17. The print cartridge of claim 14, wherein the at least one memory includes a base key, the session key based on the base key.

18. The print cartridge of claim 14, wherein the at least one memory includes a cartridge ID, the logic circuitry to use the cartridge ID as one of the input parameters.

19. The print cartridge of claim 14, wherein one or more operands of the challenge calculation change with respective iterations of the challenge calculation, a function of the challenge calculation remains unchanged between iterations.

20. A device to facilitate authentication of a replaceable print cartridge supply device, the print cartridge supply device including electrical contacts to obtain a timing challenge from a host, the device separate from the host, the device comprising:
- dedicated hardware logic circuitry designed to run a timing challenge calculation;
- at least one memory having stored thereon:
  - a base key;
  - instructions for the device to perform cryptographic operations;
  - a calculation count to define a number of calculations of the timing challenge calculation; and
  - a challenge response time within which the dedicated hardware logic circuitry is to output the response value of the timing challenge calculation; and
- processor circuitry to execute the instructions to:
  - generate a plurality of session keys based on the base key, respective session keys specific to particular communication exchanges between the processor circuitry and the host;
  - receive the timing challenge and initiate the dedicated hardware logic circuitry to run the timing challenge calculation; and
  - cause communication of the timing challenge response value, as calculated by the dedicated hardware logic circuitry, to the host via the electrical contacts;
- wherein the dedicated hardware logic is designed and fabricated to:
  - perform an initial calculation based on a random seed and one of the plurality of sessions keys as inputs;
  - perform a number of additional calculations with the output of a prior calculation as input, the number of additional calculations based on the calculation count; and
  - within the response time, calculate and output the timing challenge response value from a last of the additional calculations.

* * * * *